United States Patent
McKnight et al.

(10) Patent No.: US 9,897,819 B2
(45) Date of Patent: *Feb. 20, 2018

(54) SYSTEM AND METHOD FOR VIBRATING SCREENS TO REDUCE SPECKLE

(71) Applicant: RealD Inc., Beverly Hills, CA (US)

(72) Inventors: Douglas J. McKnight, Boudler, CO (US); Kevin Curtis, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,352

(22) Filed: Dec. 20, 2016

(65) Prior Publication Data

US 2017/0219839 A1    Aug. 3, 2017

Related U.S. Application Data

(63) Continuation of application No. 14/298,633, filed on Jun. 6, 2014, now Pat. No. 9,529,207.

(60) Provisional application No. 61/832,047, filed on Jun. 6, 2013.

(51) Int. Cl.
    *G02B 27/48*     (2006.01)
    *G03B 21/56*     (2006.01)
    *G10K 11/175*    (2006.01)

(52) U.S. Cl.
    CPC ........... *G02B 27/48* (2013.01); *G03B 21/562* (2013.01); *G10K 11/175* (2013.01)

(58) Field of Classification Search
    CPC ............... G03B 21/562; G02B 27/48
    USPC ........................................................ 359/446
    See application file for complete search history.

(56) References Cited

U.S. PATENT DOCUMENTS

| | | | |
|---|---|---|---|
| 1,817,630 A * | 8/1931 | Kroesen | G03B 21/565 181/162 |
| 3,640,602 A | 2/1972 | Wolfe | |
| 4,155,630 A | 5/1979 | Ih | |
| 4,360,372 A | 11/1982 | Maciejko | |
| 5,025,474 A * | 6/1991 | Tanaka | G03B 21/565 181/148 |
| 5,272,473 A | 12/1993 | Thompson et al. | |

(Continued)

FOREIGN PATENT DOCUMENTS

| | | |
|---|---|---|
| JP | 2011-197478 A | 10/2011 |
| KR | 10-2000-0061077 A | 10/2000 |
| KR | 10-0803222 B1 | 2/2008 |

OTHER PUBLICATIONS

International search report and written opinion of international searching authority in co-pending PCT/US2014/041394 dated Oct. 1, 2014.

(Continued)

*Primary Examiner* — Christopher Mahoney
(74) *Attorney, Agent, or Firm* — Penny L. Lowry; Neil G. Mothew (57) ABSTRACT

The present disclosure includes systems and methods for solving speckle problems by exciting the screen with a more complex vibration spectrum. A range of frequencies provides, in effect, a collection of overlapping patterns of high and low displacement, so that all regions of the screen have enough motion to reduce visible speckle. As previously discussed acceptable speckle may be approximately 15% contrast or less, preferably approximately 5% contrast or less at approximately 15 feet from the screen.

25 Claims, 7 Drawing Sheets

(56) References Cited

U.S. PATENT DOCUMENTS

| | | |
|---|---|---|
| 5,313,479 A | 5/1994 | Florence |
| 6,122,023 A | 9/2000 | Chen et al. |
| 6,844,970 B2 | 1/2005 | Olczak |
| 6,895,149 B1 | 5/2005 | Jacob et al. |
| 7,199,933 B2 | 4/2007 | Yavid et al. |
| 7,244,028 B2 | 7/2007 | Govorkov et al. |
| 7,342,719 B1 | 3/2008 | Kalmanash et al. |
| 7,379,651 B2 | 5/2008 | Abu-Ageel |
| 7,489,714 B2 | 2/2009 | Park et al. |
| 7,527,384 B2 | 5/2009 | Kim et al. |
| 7,585,078 B2 | 9/2009 | Kim et al. |
| 7,719,738 B2 | 5/2010 | Abu-Ageel |
| 7,898,734 B2 | 3/2011 | Coleman et al. |
| 7,922,333 B2 | 4/2011 | Akahane et al. |
| 8,004,758 B2 | 8/2011 | Coleman et al. |
| 8,072,681 B2 | 12/2011 | Coleman et al. |
| 8,169,699 B2 | 5/2012 | Petersen et al. |
| 8,194,315 B2 | 6/2012 | Sharp et al. |
| 8,711,477 B2 | 4/2014 | Coleman et al. |
| 9,529,207 B2 * | 12/2016 | McKnight ............ G03B 21/562 |
| 2005/0008290 A1 | 1/2005 | Miron |
| 2007/0251916 A1 | 11/2007 | Akahane et al. |
| 2009/0168025 A1 | 7/2009 | Domm |
| 2010/0053476 A1 | 3/2010 | Maxson |
| 2010/0079848 A1 | 4/2010 | Grasser et al. |
| 2010/0118397 A1 | 5/2010 | Powell et al. |
| 2011/0102748 A1 | 5/2011 | Shevlin et al. |
| 2012/0019918 A1 | 1/2012 | Dunphy et al. |
| 2013/0010356 A1 | 1/2013 | Curtis et al. |

OTHER PUBLICATIONS

Gollier, "Speckle Measurement Procedure", from the conference "Projector Summit 2010", Las Vegas NV, May 7, 2010.

Extended European Search Report for Application No. 14807131.6, dated Feb. 2, 2011.

* cited by examiner

SYSTEM AND METHOD FOR VIBRATING SCREENS TO REDUCE SPECKLE

CROSS-REFERENCE TO RELATED APPLICATION

This application claims priority to U.S. Provisional Patent App. No. 61/832,047, entitled "Screen vibration for reducing speckle", filed 6 Jun. 2013 (RealID Ref: 363000), the entirety of which is herein incorporated by reference.

TECHNICAL

This disclosure generally relates to systems and methods for reducing speckle engineered screens using screen vibration.

BACKGROUND

The use of coherent or partially coherent light sources can have advantages in display or illumination over standard incoherent sources (lamps), in that they can achieve higher brightness, better reliability, and larger color gamut. However, with this increased coherence comes the issue of speckle interference. Speckle is due to interference of the light reflecting from the screen or target that causes variations in intensity that can be seen by the observer or instrument. High spatial frequency, intensity variations are typical and very undesirable for display or imaging applications.

BRIEF SUMMARY

According to an aspect of the present disclosure, a method for reducing speckle on a projection screen may include vibrating a projection screen within a predetermined frequency spectrum, in which the predetermined frequency spectrum has power which is broadly dispersed within the predetermined frequency spectrum. As a result, speckle may be mitigated on the projection screen to within an acceptable level. The projection screen may be vibrated with at least one primary transducer which may be, for example, a voice coil. The predetermined frequency spectrum power may be primarily in the approximate range of 30-500 Hertz. The acceptable level for speckle may be less than approximately 15 percent contrast at approximately fifteen feet from the projection screen. The projection screen may include a high elastic modulus substrate, with an elastic modulus, of greater than approximately 0.4 GPa. The vibrating element may be directly attached to the projection screen or alternatively the vibrating element may be mounting to a mounting patch which may be attached to the projection screen. The method may also include producing an acceptable level of audible noise which may be less than approximately 40 dBm.

Continuing the discussion, the method may include detecting primary transducer failure by measuring the projection screen vibrations. The screen vibrations may be measured with at least one accelerometer. Redundant transducers may also be located on the projection screen in addition to the primary transducers. The redundant transducers may be driven only when a failure of at least one primary transducer is detected. The primary and redundant transducers may be located behind masking to reduce acoustic transmission from the transducers.

In another aspect of the present disclosure, a projection screen system may include a projection screen and at least one primary vibrating element attached to the projection screen, in which the vibrating element vibrates the screen within a predetermined frequency spectrum. The predetermined frequency spectrum may have power which is broadly dispersed within the predetermined frequency spectrum. Also, vibrating the projection screen may mitigate speckle to an acceptable level. The projection screen may include a high elastic modulus substrate with an elastic modulus of greater than approximately 0.4 GPa. The at least one primary vibrating element may be at least one transducer, which may be a voice coil. The predetermined frequency spectrum may be in the approximate range of 50-200 Hz. The acceptable level for speckle may be less than approximately 15 percent contrast at approximately fifteen feet from the projection screen. The at least one primary vibrating element may be mounted directly adjacent to the projection screen.

Continuing the discussion, the projection screen system may include redundant vibrating elements in addition to the at least one primary vibrating element. The redundant vibrating elements may be driven only when a failure of at least one of the primary vibrating elements is detected. Masking may be located to dampen audible acoustic transmission from the at least one primary vibrating element. The masking may be located on the from and the back of the projection screen and may comprise absorbing material.

BRIEF DESCRIPTION OF THE DRAWINGS

Embodiments are illustrated by way of example in the accompanying FIGURES, in which like reference numbers indicate similar parts, and in which.

DETAILED DESCRIPTION

According to an aspect of the present disclosure, a method for reducing speckle on a projection screen may include vibrating a projection screen within a predetermined frequency spectrum, in which the predetermined frequency spectrum has power which is broadly dispersed within the predetermined frequency spectrum. As a result, speckle may be mitigated on the projection screen to within an acceptable level. The projection screen may be vibrated with at least one primary transducer which may be a voice coil. The predetermined frequency spectrum power may be primarily in the approximate range of 30-500 Hertz. The acceptable level for speckle may be less than approximately 15 percent contrast at approximately fifteen feet from the projection screen. The projection screen may include a high elastic modulus substrate, with an elastic modulus of greater than approximately 0.4 GPa. The vibrating element may be directly attached to the projection screen or alternatively the vibrating element may be mounting to a mounting patch which may be attached to the projection screen. The method may also include producing an acceptable level of audible noise which may be less than approximately 40 dBm.

Continuing the discussion, the method may include detecting primary transducer failure by measuring the projection screen vibrations. The screen vibrations may be measured with at least one accelerometer. Redundant transducers may also be located on the projection screen in addition to the primary transducers. The redundant transducers may be driven only when a failure of at least one primary transducer is detected. The primary and redundant transducers may be located behind masking to reduce acoustic transmission from the transducers.

In another aspect of the present disclosure, a projection screen system may include a projection screen and at least one primary vibrating element attached to the projection screen, in which the vibrating element vibrates the screen within a predetermined frequency spectrum. The predetermined frequency spectrum may have power which is broadly dispersed within the predetermined frequency spectrum. Also, vibrating the projection screen may mitigate speckle to an acceptable level. The projection screen may include a high elastic modulus substrate with an elastic modulus of greater than approximately 0.4 GPa. The at least one primary vibrating element may be at least one transducer, which may be a voice coil. The predetermined frequency spectrum may be in the approximate range of 50-200 Hz. The acceptable level for speckle may be less than approximately 15 percent contrast at approximately fifteen feet from the projection screen. The at least one primary vibrating element may be mounted directly adjacent to the projection screen.

Continuing the discussion, the projection screen system may include redundant vibrating elements in addition to the at least one primary vibrating element. The redundant vibrating elements may be driven only when a failure of at least one of the primary vibrating elements is detected. Masking may be located to dampen audible acoustic transmission from the at least one primary vibrating element. The masking may be located on the front and the back of the projection screen and may comprise absorbing material.

Although the problem of speckle interference or speckle is a known problem, only a number of partial solutions exist. The measurement and characterization of speckle is also known. Speckle is measured by measuring the contrast of the light intensity and may be defined as the standard deviation over the mean of the intensity. An explanation of how to measure speckle see reference by Jacques Gollier of Corning, Inc. from the conference "Projector Summit 2010", Las Vegas Nev., May 7, 2010 entitled "Speckle Measurement Procedure."

Various methods attempting to reduce the visibility of speckle will be discussed below.

One family of solutions utilizes moving one or more diffusers to achieve changes to the local optical phase to temporally average out some of the speckle over the observer's/detector's integration period. This is generally discussed in U.S. Pat. No. 5,313,479, "Speckle-free display system using coherent light," and U.S. Pat. No. 7,585,078, "Illumination system capable of eliminating laser speckle and projection system employing the same." The diffusers can also vibrate with a large enough amplitude to cover several diffractive elements to achieve some averaging as well. This is generally discussed in U.S. Pat. No. 7,922,333, "Projector, screen, projector system, and scintillation removing apparatus for removing scintillation on an image."

Another family of solutions to reduce speckle uses moving mirrors or phase modulators to achieve the temporal averaging. This is generally discussed in U.S. Patent Pub. No. 2011/0102748, "Optical system and method," U.S. Patent Pub. No. 2010/0053476, "Systems and methods for despeckling a laser light source," U.S. Pat. No. 4,155,630, "Speckle elimination by random spatial phase modulation," and U.S. Pat. No. 7,489,714, "Speckle reduction laser and laser display apparatus having the same." These use expensive moving parts or phase modulators.

Another solution uses a large core, long, very high numerical aperture (NA) multimode fiber to "decoher" a laser beam. This is generally discussed in U.S. Patent Pub. No. 2009/0168025, "Decohered laser light production system." This system discusses the use of a 12 mm diameter core fiber with an NA of 0.65. This large fiber may provide some reduction in speckle, but destroys the brightness of the system since the etendue is so large. Although there may be some benefits to using a very long multimode fiber, as generally discussed in U.S. Patent Pub. No. 2010/0079848, "Speckle reduction in display systems that employ coherent light sources," the use of such a long multimode fiber reduces the power with absorption. Multimode fiber speckle issues and solutions are discussed further in the book SPECKLE PHENOMENA IN OPTICS by Joseph Goodman (Roberts and Company, 2006, Chapter 7).

A family of solutions has been proposed that divide the laser beams up into parts and then force each part to have a different path length, or change of polarization, before recombining the beams. The use of fiber bundles or splitter combiners or lens-let arrays may be generally discussed in U.S. Patent Pub. No. 2005/0008290 "Static method for laser speckle reduction and apparatus for reducing speckle," U.S. Pat. No. 4,360,372, "Fiber optic element for reducing speckle noise," U.S. Pat. No. 6,895,149, "Apparatus for beam homogenization and speckle reduction," U.S. Pat. No. 7,379,651, "Method and apparatus for reducing laser speckle," U.S. Pat. No. 7,527,384, "Illumination system to eliminate laser speckle and projection system employing the same," and U.S. Pat. No. 7,719,735, "Method and apparatus for reducing laser speckle." These methods use expensive fiber bundles or lens arrays or many fiber coupler/splitters to achieve some reduction in speckle.

Another family of solutions utilizes sources with larger optical spectral bandwidths. This can be achieved by chirping the drive current, using several lasers of different wavelengths, or other means. This may require additional expense or loss of light in the projection system.

Mechanical translation or rotation of screens is another approach for mitigating speckle. In the book, SPECKLE PHENOMENA IN OPTICS by Joseph Goodman (Roberts and Company, 2006, Chapter 6), Goodman calculates the needed linear shift rate of the screen in x or y or screen rotation. These motions arc in the plane of the screen which is roughly normal to the projection direction needed to average out some of the speckle during the observer's/detector's time integration period. By moving the screen, the light sequentially hits different parts of the screen, which then changes the speckle pattern. If this is done fast relative to the detector's integration period (for example, the eye is roughly 20 Hz) then the detector will see an average of several speckle patterns which results in a lower speckle contrast. U.S. Pat. No. 5,272,473, "Reduced-speckle display system,"

discloses the use of a transducer attached directly to the screen to mechanically generate surface acoustic waves to minimize speckle. U.S. Pat. No. 6,122,023, "Non-speckle liquid crystal projection display" uses a highly scattering liquid crystal as a screen and then electrically changes the liquid crystal states to alleviate speckle. Additional solutions use scattering liquids or diffuser cells as screens to improve speckle as generally discussed in U.S. Pat. No. 6,844,970, "Projection television set, screens, and method," U.S. Pat. No. 7,199,933, "Image projection screen with reduced speckle noise," U.S. Pat. No. 7,244,028, "Laser illuminated projection displays," U.S. Pat. No. 7,342,719, "Projection screen with reduced speckle," and U.S. Patent Pub. No. 2010/0118397, "Reduced laser speckle projection screen."

In practice, a few of the above-described techniques may be used together to mitigate speckle effects. However, all of the aforementioned approaches involve using additional parts and got physical translation to achieve speckle reduction. These additional parts increase cost, decrease brightness, and reduce reliability.

The present disclosure uses screen vibration to reduce speckle in display and projection applications. Typically, movie screens are made of a polymer substrate, usually elastic polyvinylchloride (PVC) roll stock that is perforated for acoustic transmission and then seamed together to make a screen of the desired size. These conventional screens are typically 0.2-0.6 mm thick, elastic with a low Young's modulus (elastic modulus), heavily plasticized, and embossed with a matte texture. To produce a polarization preserving screen, this elastic PVC screen is then sprayed with a polarization preserving coating. The conventional coating generally employs a type of metal flake, for example, ball-milled aluminum powder, encased in a polymer binder. These conventional screens are relatively heavy, elastic, and have a low Young's modulus, typically in the range of 40-60 MPa.

Significant optical performance improvements can be realized by utilizing an engineered screen with a metalized embossed surface, as described in U.S. Pat. No. 8,072,681, which is herein incorporated by reference in its entirety. For proper fidelity in the engineered screen, a more rigid substrate, such as polyester, PCT or polycarbonate (PC), may be used. Appropriate substrates may include high elastic modulus (Young's modulus) substrates that are in the approximate range of 0.4 Gpa-6 Gpa, preferably above 1 Gpa. Additionally, a hybrid approach may use the embossed surface of an engineered screen to form a textured metal flake, as described in the commonly owned U.S. Pat. No. 8,069,699, entitled "Polarization preserving projection screen with engineered pigment and method for making same," or to physically chop the metalized substrate, as described in commonly owned U.S. Pat. No. 8,194,315, entitled "Polarization preserving projection screen with engineered particle and method for making same" both herein incorporated by reference in their entirety and either of which could then be utilized to replace the metal flake in a conventional screen system. The systems and methods described in the present application may further be employed advantageously in other commonly owned projection screen applications, including but not limited to described in the commonly owned U.S. Pat. No. 7,898,734, entitled "Polarization preserving front projection screen," U.S. Pat. No. 8,072,681, entitled "Polarization preserving front projection screen material," U.S. Pat. No. 8,004,758, entitled "Polarization preserving front projection screen microstructures," and U.S. Pat. No. 8,711,477, entitled "Polarization preserving front projection screen microstructures," all of which are herein incorporated by reference in their entirety.

The substrates of these engineered screens, and, therefore, the engineered screens, are much tighter and have a higher Young's modulus than conventional elastic PVC screens. The engineered screen substrates may be any appropriate high elastic modulus substrate such as PC, PET, rigid PVC, cycloolefins, and so forth. Rear-projection polarization preserving screens typically employ a diffusely scattering transparent polymer substrate, an embossed transparent substrate, or a combination of the two.

Accordingly, in the aforementioned new engineered screens with high elastic modulus substrates, vibrations resulting from a higher frequency range can travel further than in traditional screens with low elastic modulus substrates. The higher modulus allows for surface waves with a larger out of screen plane component to be generated and propagated significantly further across the screen. This out of screen plane wave is much more effective at reducing speckle than moving the screen in plane. Additionally, both a broad frequency spectrum and a high frequency spectrum do not propagate effectively across the traditional screens. As a result, lower frequencies have to be applied to the traditional screens for effective propagation through the screen substrate, which result in audible noise. Further, to reduce speckle on traditional screens with the standard vinyl or elastic PVC substrate systems employ a frequency in the approximate range of 20-30 Hz as higher frequencies do not propagate effectively in these substrates or any low elastic modulus substrate. This is particularly true for screen sizes used in cinema applications which are typically larger than 10 feet in width.

Moreover, higher frequencies can be used to excite the screen since they propagate more efficiently across these engineered screens. As disclosed herein, frequencies in the range of 30-500 Hz can be used, preferably in the approximate range of 50-200 Hz. In certain embodiments the frequency range may be in the range of 40-100 Hz. These frequencies induce motion in the screen that is harder to see than lower frequency ranges, and better average the speckle patterns than lower frequency ranges, resulting in more effective mitigation of speckle visibility. Acceptable speckle may be approximately 15% or less contrast at approximately 15 feet from the screen, preferably approximately 5% or less contrast. In addition, the disclosed systems and methods do not require a transducer to be attached to or in contact with the portion of the screen where the image is displayed, as further described in reference to FIG. 1. Stated differently, the transducers may be attached to the edge portion of the screens or the area of the screen that may be masked from viewing. The transducers may not be attached to the front or back of the screen area that is within the viewing area or the area that is not masked. This is advantageous as locating transducers in the viewing area on either or both of the front or back of the screen may result in a higher likelihood of visibility. Additionally, should the transducers be located in the viewing area on either or both of the front or back of the screen, the vibrations may be visible to the audience which is undesirable as it is distracting and detracts from image quality and viewing enjoyment.

Additionally, mechanical excitation of a screen with good propagation characteristics can give rise to standing waves, with their associated "nodes" of little or no displacement. These regions of low displacement show visible speckle, and these regions of speckle may manifest in a pattern that depends on the details of the wave propagation across the screen. Small differences in seam structure, or attachment mechanics, appear to lead to a complex standing wave pattern.

In addition, screen vibration can cause audible noise. Vibrations that are close to single frequencies or harmonics of near single frequencies cause noise that is very distinct and easy to hear. Acceptable audible noise may be approximately 40 dBm or less, preferably approximately 35 dBm or less at approximately 15 feet from the screen.

The present disclosure includes systems and methods for solving these problems by exciting the screen with a more complex vibration spectrum. A range of frequencies provides, in effect, a collection of overlapping patterns of high and low displacement, so that all regions of the screen have enough motion to reduce visible speckle. As previously discussed acceptable speckle may be approximately 15% contrast or less, preferably approximately 5% contrast or less.

Further, the disclosure includes systems and methods for determining the range of frequencies which may be effective in removing visible speckle without causing excessive audible sound. In one embodiment, the initial spectrum may be a broad spectrum of "white" or "pink" noise or other complex broadband waveforms. The broad spectrum may then be adjusted with high and/or low pass filters in software and/or hardware while monitoring the response of the screen. In an exemplary embodiment, the noise source may be from analog electronics or may be a pseudo-random noise stream from a computer program.

In an alternative embodiment, the screen edges may be mounted to absorb some of the vibrational energy in the screen. According to this embodiment, the screen termination can be damped to attenuate reflections of travelling waves from the edge of the screen and also to minimize standing waves or regions of interference in vibration. Elastomeric bands or damped springs, rather than simple springs, may be used as mounting hardware. Alternatively, energy absorbing structures, such as foam rubber pieces, can be incorporated into the mounting hardware.

Figure 1:
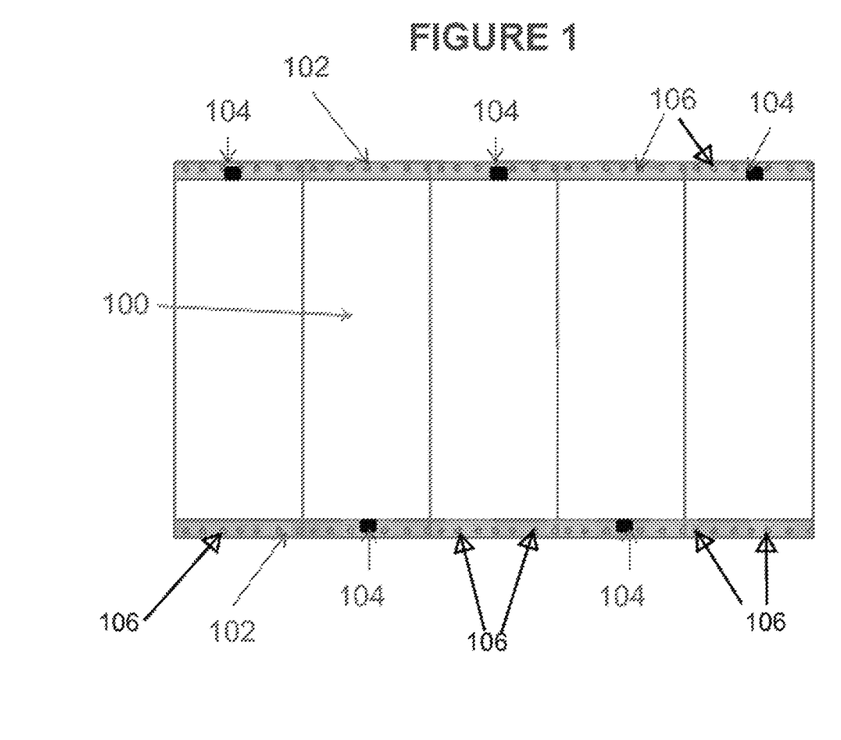
FIG. 1 is a schematic diagram illustrating a screen system used for reducing speckle, in accordance with the present disclosure.

FIG. 1 is a schematic diagram illustrating a screen system for reducing speckle. The screen 100 may include one or more mounting strips 102. The mounting strips 102 add stiffness and thickness to the screen 100, and may spread the load from mounting holes 106 in the edge of the screen 100. In an embodiment, there may be mounting strips 102 on the top of the screen 100 and on the bottom of the screen 100. In alternative embodiments, there may be a mounting strip 102 only on the top of the screen 100, or only on the bottom of the screen 100. In yet another embodiment, the mounting strip may be cut into smaller patches, for example, approximately four inch mounting patches, and may be located across the top and the bottom of the screen. Additionally, mounting patches can be smaller than approximately one inch or as large as approximately fifteen inches wide. These methods are generally discussed in Provisional Patent App. No. 61/938,304, "Strain relieved mounting method for screen material," filed Feb. 11, 2014, and which is herein incorporated by reference in its entirety.

Mounting holes 106, which may be grommeted, allow mounting springs or cords to be attached to the screen 100, and then to the screen mounting frame, to tension and mount the screen 100 in a convenient way. Mounting strips on the sides of the screen maybe used as well, as described in the commonly-owned U.S. App. No. 61/697,692, entitled "Mechanical design and optical benefits of high elastic modulus cinema screen substrates," which is herein incorporated by reference in its entirety.

The screen 100 also includes one or more transducers 104 mounted on the mounting strips 102. In one embodiment, this may increase the range that the vibrations travel across the screen 100. In another embodiment and as will be discussed with respect to FIG. 2, the transducers may also be attached directly to the screen edges as opposed to mounting the transducers to the mounting strip or mounting patches.

Continuing the discussion of FIG. 1, the vibrations can travel far enough across the screen such that the transducers 104 can be attached in various configurations around the edges of the screen 100. Significantly, the transducers 104 do not have to be attached to or in contact with the front or the back of the screen 100 are in which the image is displayed. Stated differently, the transducers may be mounted on the edges of the screens or in the screen area that is masked. Placing the transducers behind the screen masking is also beneficial for noise reduction. Typical masking may range from approximately 1 inch to a couple of feet depending on the screen mounting scheme, room and image geometry. The masking is typically black and can be complemented with noise absorbing or reflecting materials such as plastics, foam, fabrics, wool, metal, wood, or any other appropriate material, or any combination thereof. Masking may be located or hung in front of the screen edge, or edges with a wire or cord stretched in front of the screen portion to be masked and attached to the screen frame. In order to position the masking closer in proximity to the screen without touching the screen, a metal bar or metal sheet may be used to hold the sound absorbing masking closer to the screen. The masking may be located across the whole screen perimeter or edges or only at the transducer locations. For sound reduction reasons, masking on the front and back of the screen may be used.

For smaller screens, one or more vibration transducers 104 may be mounted at the bottom of the screen 100. The transducers 104 can be mounted using screws and plates that clamp the mounting strip 102 and hold the transducers 104 to the screen 100. Another alternative is to have the transducers 104 mounted to the metal frame of the screen 100 and in contact with the mounting strip 102. Typically, the spacing can be from 4 to 40 feet apart on the mounting strip 102. Because the mounting strip 102 is mechanically more robust, heavy transducers and/or more forceful transducers can be used. The mounting strip 102 may also more uniformly couple the vibration to the screen 100 over an area, rather than as a point contact. Mounting transducers by gluing them to the mounting strip (with or without additional plates) is also possible. Ideally the mass of the mounting hardware may be minimized so that the vibration is not dampened. Mounting the vibrating elements or transducers to patches or directly to screen with these methods is also possible depending on the weight of the transducers. The terms vibrating elements and transducers may be used interchangeably herein for purposes of discussion only and not of limitation.

Transducers 104 may include mechanical elements or devices such as mechanical vibration devices, off-axis or unbalanced motors, flexures or regular motors (either linear motion or rotary), piezo-electric, voice coils, or other types of vibration devices. However, where spinning motors are used, the resulting excitations are single-frequency dominated or harmonic dominated. Vibrations that are close to single frequencies or harmonics of near-single frequencies cause noise that can be more distinct and easy to hear as previously discussed.

Figure 2:
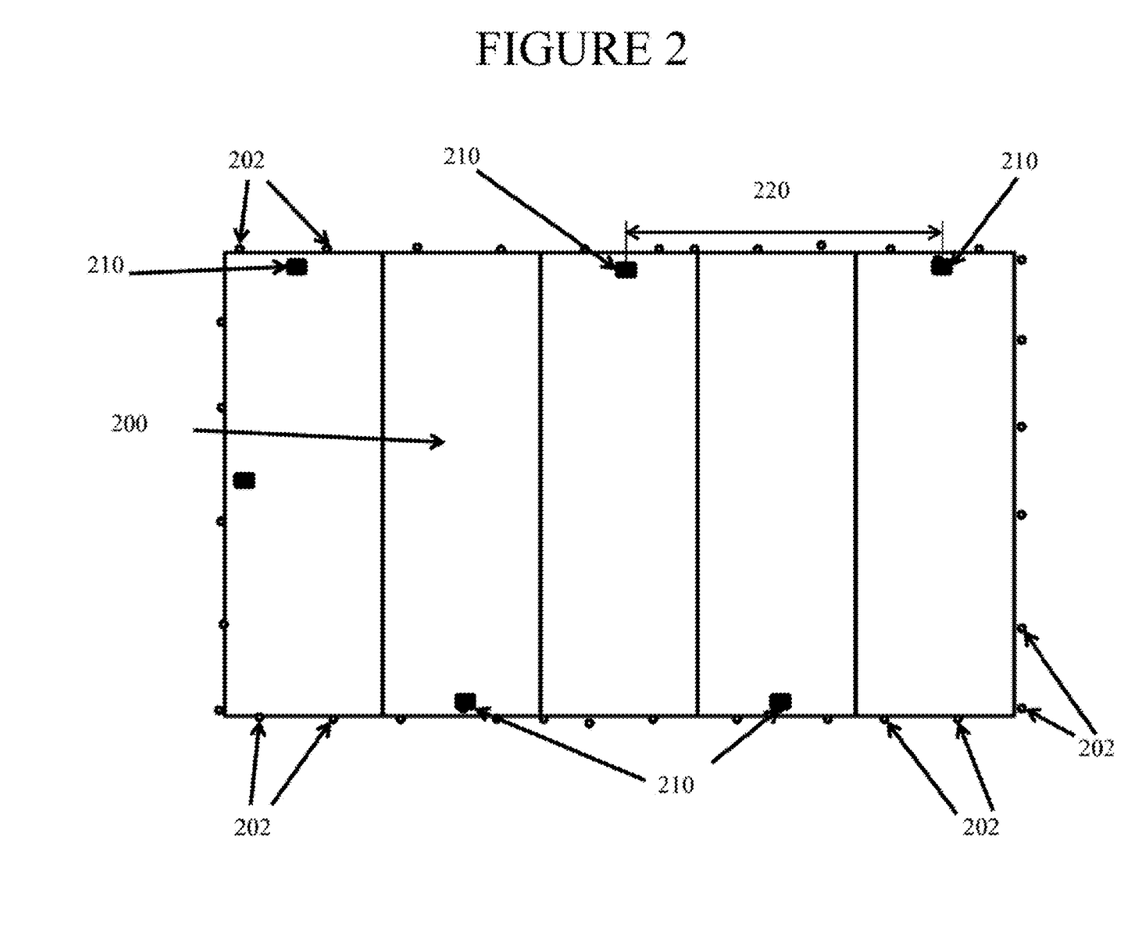
FIG. 2 is a schematic diagram illustrating another screen system for reducing speckle, in accordance with the present disclosure.

FIG. 2 is a schematic diagram illustrating another screen system for reducing speckle. The screen system of FIG. 2 is similar to the screen system of FIG. 1, however, FIG. 2 does not include a mounting strip. The screen 200 may include one or more mounting patches 202. The mounting patches 202 may include eye loops for attaching the screen to a frame. The screen 200 may be attached with shock cords, springs, or any other appropriate element. Also illustrated in FIG. 2 are the transducers 210. The transducers 210 may be mounted on a mounting patch 202, mounting strip (not shown), or mounted directly on the screen 200 as shown in FIG. 2. The transducers 210 may have spacing 220. The transducer spacing may be determined by the size and, the elastic modulus of the screen substrate. The transducer spacing may additionally be determined by the energy/power of signal input into the transducer and transferred to the screen for acceptable speckle reduction. The practical energy/power that can be used may be limited by transducer characteristics such as reliability, power handing capabilities, and so forth, and the audible noise that may be generated. In general, more transducers with less power may be spaced apart and may result in quieter operation than one very powerful transducer, and may result in better speckle suppression.

Figure 3:
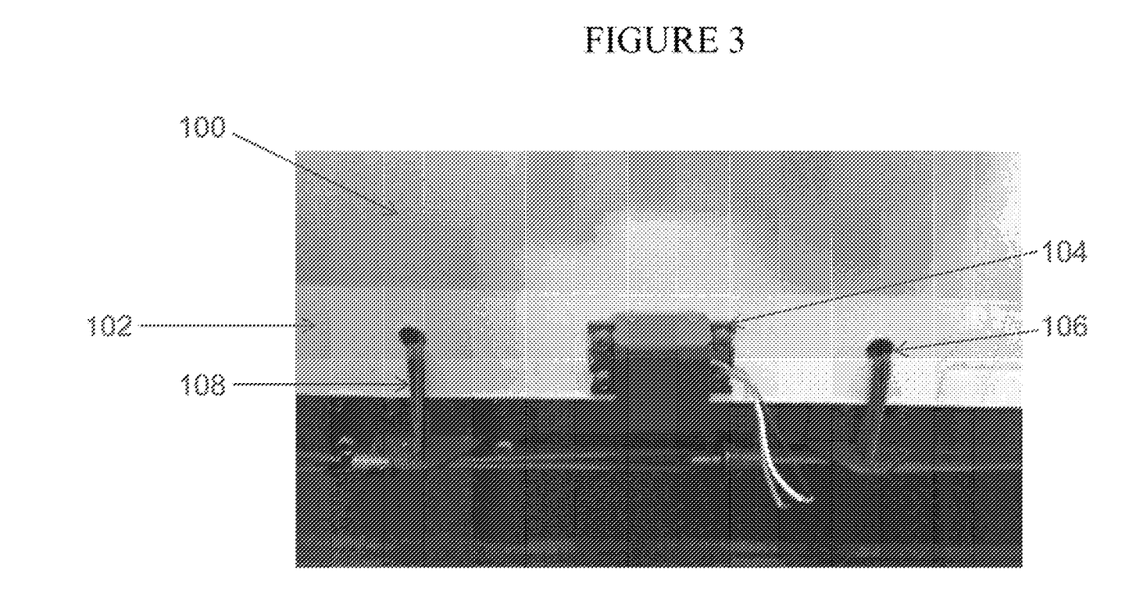
FIG. 3 is an illustration of a mechanical transducer mounted on a mounting strip, in accordance with the present disclosure.

FIG. 3 is an illustration of a mechanical transducer 104 mounted on a mounting strip 102. The illustration of FIG. 3 also includes bands 108 that tension the screen 100. In an embodiment, the screen termination can be damped to attenuate reflections of travelling waves from the edge of the screen 100 as well as reducing the formation of standing waves even for more limited bandwidth vibrations. Thus, elastomeric bands 108 or damped springs, rather than simple springs, may be used as mounting hardware, as shown in FIG. 3. Alternatively, energy absorbing structures, such as foam rubber pieces, can be incorporated into the mounting hardware. In addition, the mounting hardware may be configured such that the vibration does not generate additional audible noise. Thus cords or damped springs may function better than typical metal springs for acoustic purposes.

Figure 4:
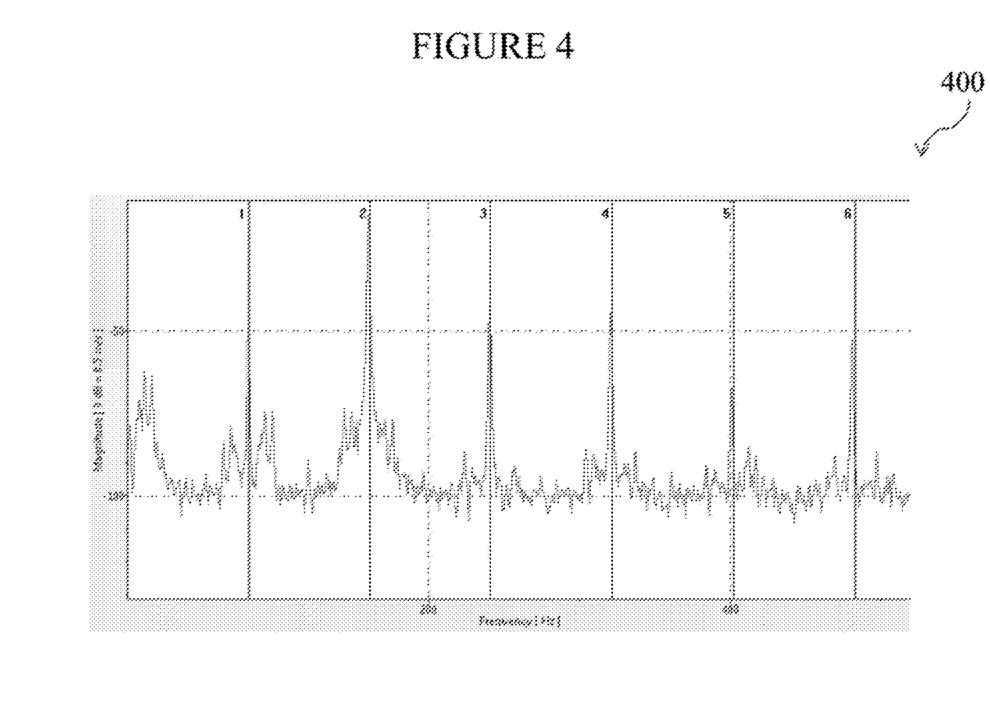
FIG. 4 is a schematic diagram illustrating a spectrum of screen vibration using a mechanical transducer, in accordance with an embodiment of the present disclosure.

FIG. 4 is a schematic diagram illustrating a spectrum 400 of screen vibration using a mechanical transducer. FIG. 4 illustrates frequencies generated on an engineered screen with high elastic modulus. The mechanical transducer used to generate the spectrum 400, produced harmonies which are audible and above an acceptable noise level. Stated differently, the power or energy of the mechanical transducer is concentrated at harmonic frequencies and produces undesirable audible noise. More specifically, the human brain recognizes and/or hears tones or concentrated harmonic frequencies very well, as compared to not being able to easily recognize or hear an approximately equal amount of and widely dispersed amount of power spread across many frequencies.

Figure 5:
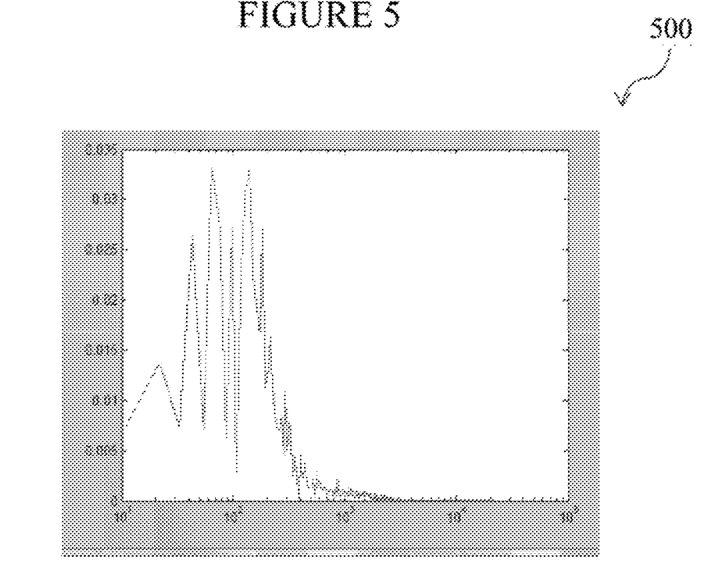
FIG. 5 is schematic diagram illustrating a power spectrum of a noise source tailored to have both low and high frequencies diminished in accordance with the present disclosure.

FIG. 5 is schematic diagram illustrating a power spectrum 500 of a noise source tailored to have both low and high frequencies diminished. FIG. 5 illustrates Hertz on the x-axis and normalized power/Hertz on the y-axis. The spectrum 500 is a predetermined frequency spectrum or power spectrum of the electrical signal that drives the transducers. Stated differently, the spectrum 500 is the Fourier transform of the electrical signal provided to the transducer. Generally, higher frequencies are easier to hear and therefore undesirable and lower frequencies are hard to excite well without large, heavy transducers, such as sub woofers as compared to normal speakers, and can cause beating effects with certain projector flash frequencies. This power spectrum may be generated by employing high band pass and low band pass filters to filter white noise or other broadband waveforms to produce the spectrum of FIG. 5.

Further, FIG. 5 illustrates power or energy that is broadly dispersed within the predetermined frequency spectrum, as opposed to FIG. 4 which illustrates power or energy concentrated at harmonic frequencies and power or energy that is not broadly dispersed within the frequency spectrum. As shown in FIG. 5, some frequencies have higher energy in this waveform but in general the waveform of the vibration or signal is spread or broadly dispersed across many frequencies. The amount of energy in a specific frequency is typically not of primary importance. The signal can be tailored to the transfer function of the transducer for best operation of speckle reduction, minimal sound, and best power efficiency. The predetermined frequency spectrum may be in the approximate range of 30-500 Hz, and preferably in the approximate range of 50-200 Hz. In certain embodiments the predetermined frequency range may be in the range of 40-300 Hz.

A noise source can be tailored to a predetermined frequency spectrum or power spectrum and may have both high and low frequencies diminished to reduce the visibility of speckle over the whole screen area without causing objectionable audible noise. An exemplary spectrum 500, such as the one depicted in FIG. 5, may be used to drive a transducer or transducers 104 attached to a screen 100, which reduces the visibility of speckle over the whole screen area without causing objectionable audible noise. Lightweight plates that clamp the screen 100 on both sides can be used to effectively couple the voice coil transducer 104 to the screen directly as described in FIG. 2, or the screen mounting strip as described in FIG. 1. In an alternative embodiment, piezoelectric devices can be driven with complex waveforms. A range of frequencies provides, in effect, a collection of overlapping patterns of high and low displacement, so that all regions of the screen 100 have enough motion to reduce visible speckle.

The motion induced by the transducers may be in the z-direction or out of the screen plane. This may better mitigate speckle than motion in the screen plane, by time averaging multiple speckle patterns during the integration time of the eye. The integration time of the eye is typically in the approximate range of 50 milliseconds-150 milliseconds. Multiple transducers can be mounted together and may be driven by the same electronics. The multiple transducers may be located on different sides of the screen or the same side of the screen. The relative phases of the transducers can be in or out of phase or randomly phased. Extra or redundant transducers can be placed on the screen in addition to the primary vibrating elements or primary transducers. The redundant transducers or redundant vibrating elements may only be employed or driven when a failure of another primary transducer is detected to increase reliability of the system. The primary transducers may be the transducers that are driven in the normal state of the projection screen system, whereas the redundant transducers may only be driven when a primary transducer fails. Failures can be detected by measurement of screen vibration with accelerometers or measured when a particular primary transducer is open or shorted. Additionally, in the case that one or more redundant transducers are vibrating the screen, these redundant transducers may be monitored for failure as well. Should one of the redundant transducers fail, then another redundant transducer may be employed to vibrate the screen.

Further, the disclosure provides methods for determining the approximate range of frequencies that may be effective in removing visible speckle without causing excessive audible sound. One way of accomplishing this is to start with broad spectrum "white" or "pink" noise and then adjust high and low pass filters in software or hardware while monitoring the response of the screen. The noise source may be from analog electronics or may be a pseudo-random noise stream from a computer program. According to an exemplary method, a noise stream can be created in a computer program and then the acoustic filter values can be varied until a satisfactory result is achieved, such as generating noise less than approximately 40 dBm. An exemplary noise spectrum is white noise that is high-pass filtered with roll-off of 24 dBm per octave with a −3 dB frequency of 30 Hz and a low-pass filter with a roll-off of 24 dB per octave and a −3 dB frequency of 70 Hz. The noise or frequency spectrum may vary based on the type of transducer, the screen substrate, the strip substrate, and whether the transducer is mounted directly to the screen or mounted on a patch that is attached to the screen.

Figure 6:
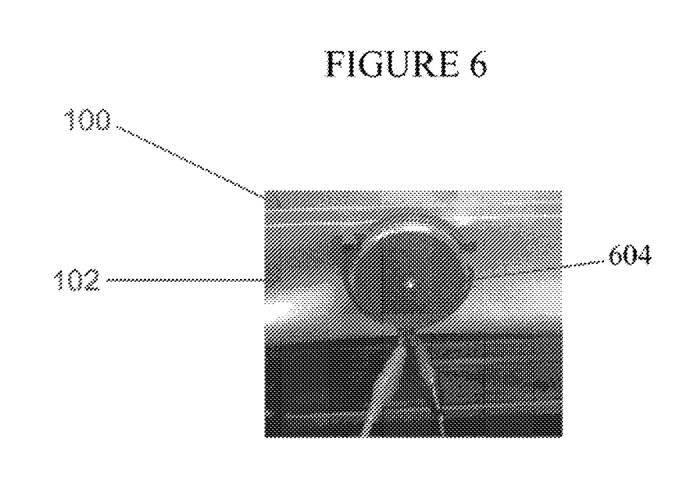
FIG. 6 is an illustration of a voice coil transducer, in accordance with the present disclosure.

FIG. 6 is an illustration of a voice coil transducer 604 attached to the screen 100 of FIG. 1. As shown in FIG. 6, lightweight plates that clamp the screen 100 from both sides can be used to effectively couple the transducer 604 to the screen mounting strip 102 or directly to the screen as discussed with respect to FIG. 1. As previously discussed the lightweight plate that clamps the transducer to the screen may propagate less audible noise when compared to heavier damping mechanisms that may be employed. The lightweight plates may weigh less than approximately 150 grams and preferably less than approximately 50 grams.

Figure 7A:
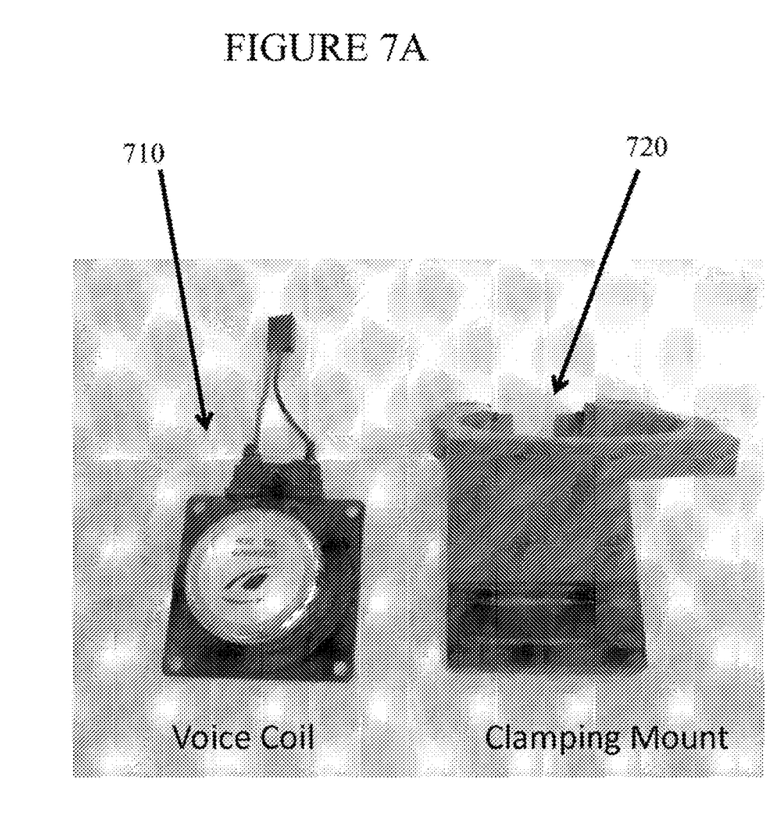
FIGS. 7A and 7B are illustrations of a voice coil and a mount, in accordance with the present disclosure.
Figure 7B:
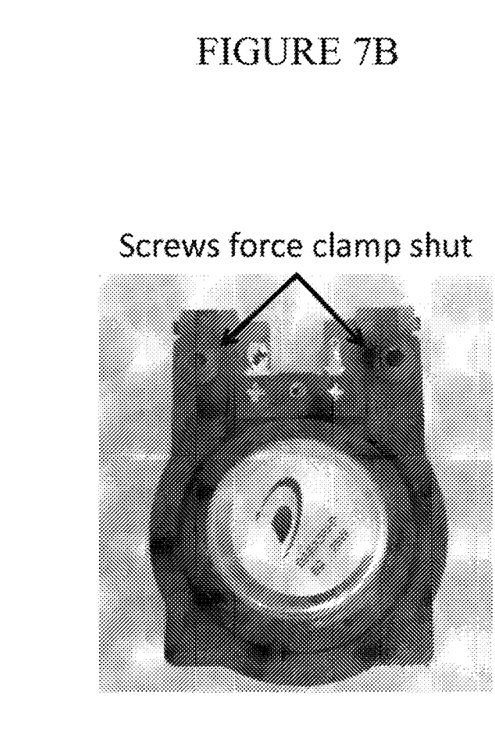

FIGS. 7A and 7B are illustrations of a voice coil 710 and a mount 720. Transducers, such as the voice coil illustrated in FIGS. 7A and 7B can be mounted to the screen in a number of ways. The transducers or vibrating elements can be mounted on a mounting strip, a patch, or directly to the screen. The mounting strip may be a strip that is glued to one or both sides of the edge of the screen to make the attachment area for mounting the screen to the screen frame thicker, as previously discussed. A patch may be a plastic patch that may be mounted to the screen, by glue or mechanical means and contains a method for hooking the screen to a spring, shock cord, cord or other device to connect screen to the frame. A patch used to mount a transducer may not employ a method to connect to a shock cord or other device. The transducer can be mourned to these areas by mechanical means such as being glued or the use of bolts and screws through the screen, however, these methods typical damage the screen.

In FIGS. 7B and 7B an alternative family of mounting solutions is presented. A mechanical mount can hold the transducer so that the two halves of the mount clamp or press the screen from both sides. FIG. 7A illustrates a picture of the transducer which is a voice coil 710 and a clamping mount 720. As shown in FIGS. 7A and 7B, it is made of plastic but other materials can be used; however, light materials are typically better. Additionally illustrated in FIG. 7B, is the voice coil inserted into the mount with the mount clamp closed by using two screws, bolts, nuts, or any other appropriate fastening element. The bolts or screws may pass through the screen so that the assembly can be located on any part of the screen perimeter or edges. With that said, the assembly may also be placed at the edge of the screen but with the bolts located off the screen so that no holes are needed in the screen. In this example, the rest of the mount may still clamp the screen to hold the transducer to the screen, but without damaging the screen. This may allow the transducers to be placed anywhere on the edge perimeter of the screen. Multiple transducers can be placed around the screen depending on the size of the screen and for redundancy should any fail.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method for reducing speckle on a projection screen, comprising:
   vibrating the projection screen within a predetermined frequency spectrum, wherein the vibration of the projection screen is out of the screen plane; and
   locating vibrating elements behind masking to reduce acoustic transmission from the vibrating elements.

2. The method for reducing speckle on a projection screen of claim 1, further comprising vibrating the projection screen with at least one primary transducer.

3. The method for reducing speckle on a projection screen of claim 2, wherein the at least one primary transducer further comprises a voice coil.

4. The method for reducing speckle on a projection screen of claim 2, further comprising mounting the at least one primary transducer to a mounting patch, wherein the mounting patch is attached to the projection screen.

5. The method for reducing speckle on a projection screen of claim 2, further comprising detecting primary transducer failure by measuring the projection screen vibrations.

6. The method for reducing speckle on a projection screen of claim 5, further comprising measuring projection screen vibrations with at least one accelerometer.

7. The method for reducing speckle on a projection screen of claim 5, further comprising locating redundant transducers on the projection screen.

8. The method for reducing speckle on a projection screen of claim 7, further comprising driving the redundant transducers only when a failure of at least one primary transducer is detected.

9. The method for reducing speckle on a projection screen of claim 1, wherein the predetermined frequency spectrum power is primarily in the range of 30-500 Hertz.

10. The method for reducing speckle on a projection screen of claim 1, wherein the speckle is reduced to less than 15 percent contrast at fifteen feet from the projection screen.

11. The method for reducing speckle on a projection screen of claim 1, wherein the projection screen further comprises a high elastic modulus substrate.

12. The method for reducing speckle on a projection screen of claim 11, wherein the high elastic modulus substrate has an elastic modulus of greater than 0.4 GPa.

13. The method for reducing speckle on a projection screen of claim 1, further comprising attaching at least one vibrating element directly to the projection screen.

14. The method for reducing speckle on a projection screen of claim 1, wherein vibrating the screen further comprises producing an acceptable level of audible noise of less than 40 dBm.

15. A projection screen system comprising:
a projection screen;
at least one primary vibrating element attached to the projection screen, wherein the vibrating element vibrates the screen within a predetermined frequency spectrum and vibrates the screen out of the screen plane; and
masking located to dampen audible acoustic transmission from the at least one primary vibrating element.

16. The projection screen of claim 15, wherein the projection screen comprises a high elastic modulus substrate.

17. The projection screen of claim 16, wherein the high elastic modulus substrate has an elastic modulus of greater than 0.4 GPa.

18. The projection screen of claim 15, wherein the at least one primary vibrating element comprises at least one primary transducer.

19. The projection screen of claim 18, wherein the at least one primary transducer comprises a voice coil.

20. The projection screen of claim 15, wherein the predetermined frequency spectrum is in the range of 50-200 Hz.

21. The projection screen of claim 15, wherein vibrating the screen reduces the speckle to less than 15 percent contrast at fifteen feet from the projection screen.

22. The projection screen of claim 15, wherein the at least one primary vibrating element is mounted directly adjacent to the projection screen.

23. The projection screen of claim 15, further comprising redundant vibrating elements in addition to the at least one primary vibrating element, wherein the redundant vibrating elements are driven only when a failure of at least one of the primary vibrating elements is detected.

24. The projection screen of claim 15, wherein the masking is located on the front and the back of the projection screen.

25. The projection screen of claim 15, wherein the masking further comprises noise absorbing material.

* * * * *